April 16, 1957   C. J. HOLINGER   2,788,794
GAS LOADED SAFETY DISKS
Filed June 1, 1954   6 Sheets-Sheet 1

INVENTOR.
Carl J. Holinger
BY *Harry E. Westlake Jr*
AGENT

April 16, 1957 C. J. HOLINGER 2,788,794
GAS LOADED SAFETY DISKS
Filed June 1, 1954 6 Sheets-Sheet 3

INVENTOR.
Carl J. Holinger

BY *Harry E. Westlake Jr.*
AGENT

April 16, 1957 C. J. HOLINGER 2,788,794
GAS LOADED SAFETY DISKS
Filed June 1, 1954 6 Sheets-Sheet 4

INVENTOR.
Carl J. Holinger

BY *Harry E. Westlake Jr.*
AGENT

April 16, 1957     C. J. HOLINGER     2,788,794
GAS LOADED SAFETY DISKS

Filed June 1, 1954     6 Sheets-Sheet 5

INVENTOR.
Carl J. Holinger

AGENT

April 16, 1957 C. J. HOLINGER 2,788,794
GAS LOADED SAFETY DISKS
Filed June 1, 1954 6 Sheets-Sheet 6

INVENTOR.
Carl J. Holinger

AGENT

United States Patent Office 2,788,794
Patented Apr. 16, 1957

2,788,794

GAS LOADED SAFETY DISKS

Carl Jacques Holinger, Plainfield, N. J., assignor to American Cyanamid Company, New York, N. Y., a corporation of Maine Application June 1, 1954, Serial No. 433,432

12 Claims. (Cl. 137—71)

This invention relates to safety devices for the protection of pressure systems from the dangers of hazardly high pressures, and more specifically to a method of using safety devices for such pressure systems such that the operating pressure of the equipment is closer to the allowable limits, and to the safety devices which permit such operation.

The use of pressure systems, in which term is included pressure vessels as well as systems of piping under pressure, requires the installation of automatic safety equipment which will react at once to pressure in excess of that which is safe for the operation of the equipment. This is especially true when chemical reactions are carried out, since under such conditions hazardly high pressures can build up fast.

In the past it has become standard practice to equip some pressure systems with diaphragms which are intended to fracture at a desired pressure limit. This limit is hereinafter referred to as the predetermined relief pressure. Such diaphragms are usually constructed of metal, although sometimes various plastic or elastomeric materials may be used. By previous calibration of a similarly constructed diaphragm the pressure limit at which the pressure within the system will automatically burst the diaphragm can be determined. This calibration is made at a relatively fast rise in pressure which is not duplicated at the slower pressure rises normal in process equipment. On a slow pressure rise the diaphragm will burst at a considerably lower pressure and therefore one cannot work too close to fracturing pressure. In the past it has been determined that for an indefinitely long operating life in process equipment, the diaphragm should be used at only one-half of its calibrated fracturing pressure, and such practice has become standard.

Another of the major difficulties encountered with safety diaphragms is the weakening of the material due to flexing. If a pressure less than fracturing pressure is applied to one side of a diaphragm, the diaphragm will bulge, presenting its concave side to the source of pressure. If the pressure on the diaphragm is then reversed, as when the system is evacuated, the diaphragm bulge shape will invert at a relatively low pressure. Such inversion, if it occurs often enough, can break the diaphragm due to flexing, but even when the diaphragm does not break the flexing decreases the strength of the diaphragm, which will then break at a much lower pressure. The prior art has suggested preforming a metal diaphragm into a concave-convex shape with the concave side toward the higher pressure. The disadvantage of this suggestion is that the preshaped diaphragm inverts its shape under a much lower reverse pressure than would be needed to burst it. Consequently, when the pressure in the system becomes much less than that outside, as when the system is evacuated, the preshaped diaphragm can invert. The distortion by this inversion weakens the diaphragm. If the diaphragm is made strong enough to resist this inversion of shape, it is apt to be too strong for the uses contemplated.

Guards have been placed beneath the diaphragms to stop this reversal of the shape when vacuum is applied to the pressure system. However, these can never prevent some retrogressive movement of the diaphragm and the latter, having once been distorted, will not shrink back to its original size. The result is bending and crumpling which further weakens the diaphragm. Such crumpling is not prevented even when the guard is formed to follow the contour of the bulged diaphragm. To attempt to cure this disadvantage it has been proposed that two preformed diaphragms be placed in tandem with the convex sides toward one another, and that the space between them be evacuated. This presents the disadvantage that atmospheric pressure preloads the diaphragm and therefore the permissible operating pressure must be reduced correspondingly in order to insure an indefinitely long life by keeping the gross load to one-half the bursting pressure of the diaphragm.

Other multiple arrangements of diaphragms have been described for special purposes. One such multiple arrangement was used to prevent bursting at pressures below the desired relieving pressure, due to deformation by a vacuum, by inclusion of a liquid between two concave-convex diaphragms. Another was used to reduce fire hazard from liquids ejected when pressure was released, by filling the space between the diaphragms with a pyroquenching fluid.

In my invention a method is provided by which it is possible to provide pressure equipment with a permissible operating pressure (hereinafter referred to as POP) much closer to the predetermined relieving limit of the safety device. Due to distortions and inaccuracies described above, if a diaphragm is to have an indefinite life, the POP of pressure equipment has been up to now about one-half the bursting limit of the safety diaphragm. A fair life could be anticipated with POP's of about two-thirds of diaphragm fracturing pressure. Above that fraction operation has heretofore been found to be extremely erratic. I have now found a mode of operation and arrangements of diaphragms permitting such operation with POP's approaching very closely to the predetermined safety bursting pressure. With indefinite diaphragm life expectancy, as opposed to the above fair life, the safety devices and mode of operation of my invention permit a POP of over two-thirds the predetermined relief pressure limit.

The safety devices of my invention are constructed with a plural arrangement of closures in the vent pipe of the pressure equipment. These closures are usually rupture diaphragms, although the closure closest to the atmosphere may also be a safety valve. Fluid under positive pressure in the chamber between any two closures provides a backing force which enables a weak diaphragm to withstand pressures much greater than its normal rupture pressure. By proper adjustment of the backing forces and the response pressures of the closures, the rupture of the entire device is initated at the pressure which is equal to the response pressure of the closure nearest the pressure equipment added to the fluid pressure in the chamber immediately to the atmosphere side thereof. At the same time, the proper adjustment of those relationships permits the operation of the equipment much closer to that limit than had previously been possible.

In this specification, the term response pressure is used to described the pressure at which any one of a number of actions occur, all of which actions have the common denominator of being movements at a fairly accurately predetermined pressure which effect the sudden opening of a closure. These actions will be more easily understood in relation to the accompanying drawings, but they can be summarized as the rupture of a diaphragm, either from direct pressure or by a puncture spike, the release of a safety valve, the expansion of an elastomeric diaphragm beyond predetermined limits, or the inversion of shape in a preformed concave-convex metal diaphragm. The terms relief pressure or predetermined relief pressure are used in the specification to indicate the previously decided upon limit at which the safety device is expected to open and permit the relief of pressure in the equipment. The term venting pressure is used to define the pressure at which a diaphragm will rupture because of strain imposed beyond its strength. This is opposed to the rupture caused by mechanical action such as a puncture spike. In those cases where the inherent strength of the diaphragm is the sole concern, without mechanical details of construction being involved in the rupture, the response pressure becomes equivalent to the venting pressure.

The various safety devices and mode of operation which form the several embodiments of my invention will be better understood with reference to the drawings.

Figure 1:
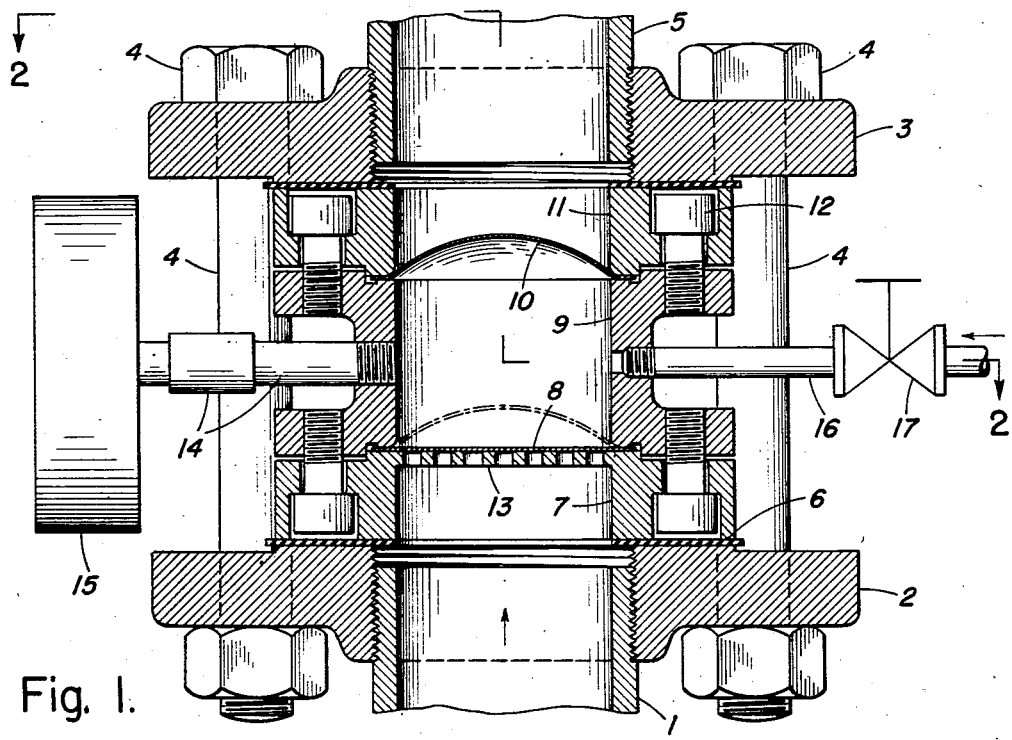
Fig. 1 shows a sectional elevation of a safety device having two diaphragms with a space between them under controlled gas pressure.
Figure 2:
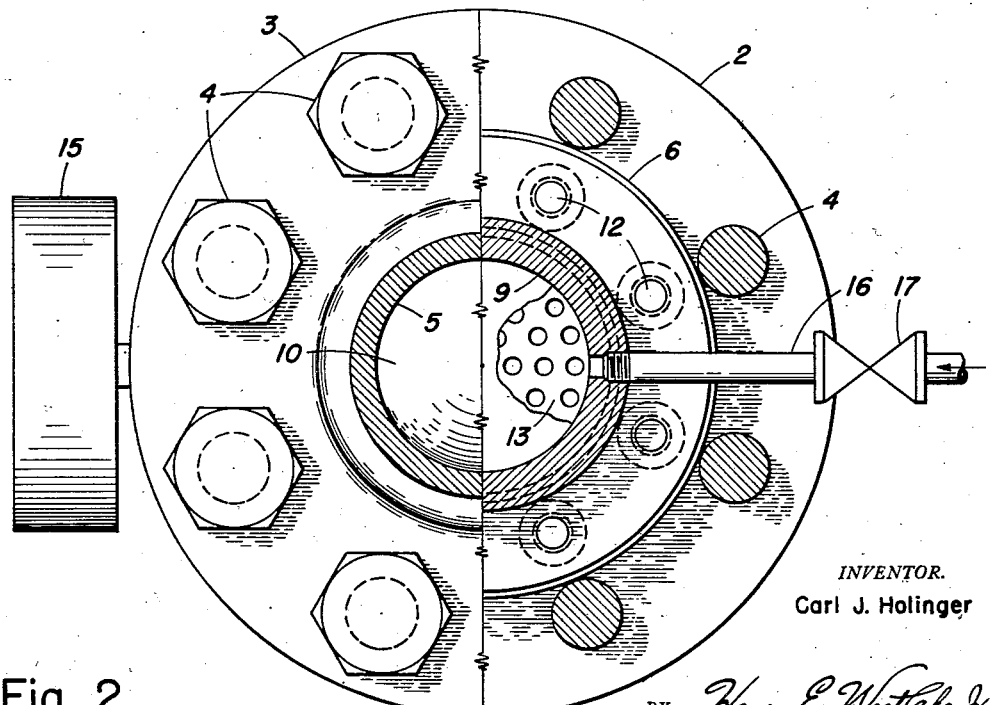
Fig. 2 shows a partial horizontal section of the embodiment of Fig. 1 along the line 2—2.

In Figs. 1 and 2 there is shown a safety device in which my invention can be relatively simply described. The figures show the safety device installed in the exhaust line of a pressure system, with the latter (not shown) being below the installation. This is not a necessary position since the safety device may be installed in any convenient physical relationship to the system. To nipple 1, leading from the pressure system, there is attached by threads a bottom flange 2 which is fastened to an upper flange 3 by collar bolts and nuts 4. The upper flange 3 is fastened by threads to a pipe 5 leading to the exhaust stack. The two main flanges 2 and 3 hold between them the essential parts of the safety devices, sealed against gas leaks by gaskets 6. These essential parts consist of three clamping flanges, connected parts and the two closures, which in this embodiment are flat diaphragms. The lower clamping flange, held by a gasket 6 against the lower flange 2, is used to hold the inner diaphragm 8, nearest the pressure system, against the central clamping flange 9. Similarly the diaphragm 10, nearest the atmosphere is held against the central clamping flange 9 by the upper clamping flange 11. The upper and lower clamping flanges, 11 and 7 respectively, are fastened to the central clamping flange 9, holding the diaphragms in place by screws 12. A vacuum guard 13 is beneath the lower diaphragm. In this embodiment, the guard is a solid disk resting on a ledge in the clamping flange, but otherwise free to move and permit passage of gas around it to the diaphragm. A pressure gage 15 is connected through a connecting passageway 14 to the interdiaphragm space. A source of fluid pressure (not shown) is similarly connected to this space through a pressure regulating valve 17 and a connecting passageway 16.

In the operation of this embodiment of my invention, a fluid, usually a gas, is introduced into and maintained under pressure through a pressure regulator 17 in the space between the diaphragms 8 and 10. The maintenance is shown here through a pressure regulator. The term is used to include also the case where the pressure is built up and then maintained by closing the inlet and sealing the chamber. Diaphragm 10, nearest the atmosphere, is shown in the drawing in expanded position, being under pressure. Diaphragm 8, nearest the pressure system, is protected by the guard 13 against inverted rupture by a vacuum in the pressure system. A pressure system equipped with a single diaphragm rated at 100 p. s. i. venting pressure could not be operated at a pressure higher than 50 p. s. i. without shortening the life of the diaphragm. A fair life would still be observed at a POP of 66 p. s. i. However, when such a 100 p. s. i. rated diaphragm is used as the outer diaphragm 10 in Figs. 1 and 2, and a diaphragm rated at 50 p. s. i. venting pressure is used as the inner diaphragm 8, a long-life POP of 75 p. s. i. is possible. The interdiaphragm space is charged with fluid, e. g. compressed air, through the regulating valve 17, at 50 p. s. i. pressure. The vacuum guard 13 prevents this pressure from distorting or fracturing diaphragm 8 in the direction of the pressure equipment. Diaphragm 10 is now loaded with a pressure of half its venting pressure and can be expected to have indefinite life under those conditions.

The pressure equipment is now put into use. Until a pressure greater than 50 p. s. i. is developed, diaphragm 8 has no load upon it from the pressure equipment side because it is backed by the gas pressure in the interdiaphragm space. Since it is a 50 p. s. i. rated disc, it can be subjected to a new pressure of 25 p. s. i. This is in addition to the 50 p. s. i. in the interdiaphragm space. The POP is thus 75 p. s. i. If the pressure in the equipment should rise to 100 p. s. i., the diaphragm 8 (rated at 50 p. s. i. venting pressure), will burst since the internal pressure in the equipment will have reached an amount 50 p. s. i. above the pressure in the interdiaphragm space. The 100 p. s. i. pressure will then be imposed upon and will burst diaphragm 10, which is rated at 100 p. s. i. The net result of this device is that the diaphragms are subjected to only half their rated venting pressure during normal operation, and therefore have indefinite life, but the POP of the equipment has been raised to 75% of the venting pressure instead of the former 50%. If only a fair life is acceptable for the diaphragms, an interdiaphragm pressure of 66 p. s. i. in the above example and a diaphragm 8 rated at 34 p. s. i. will permit a POP of 66 p. s. i. plus two-thirds of 34 p. s. i. or a total of 88 p. s. i.

Figure 3:
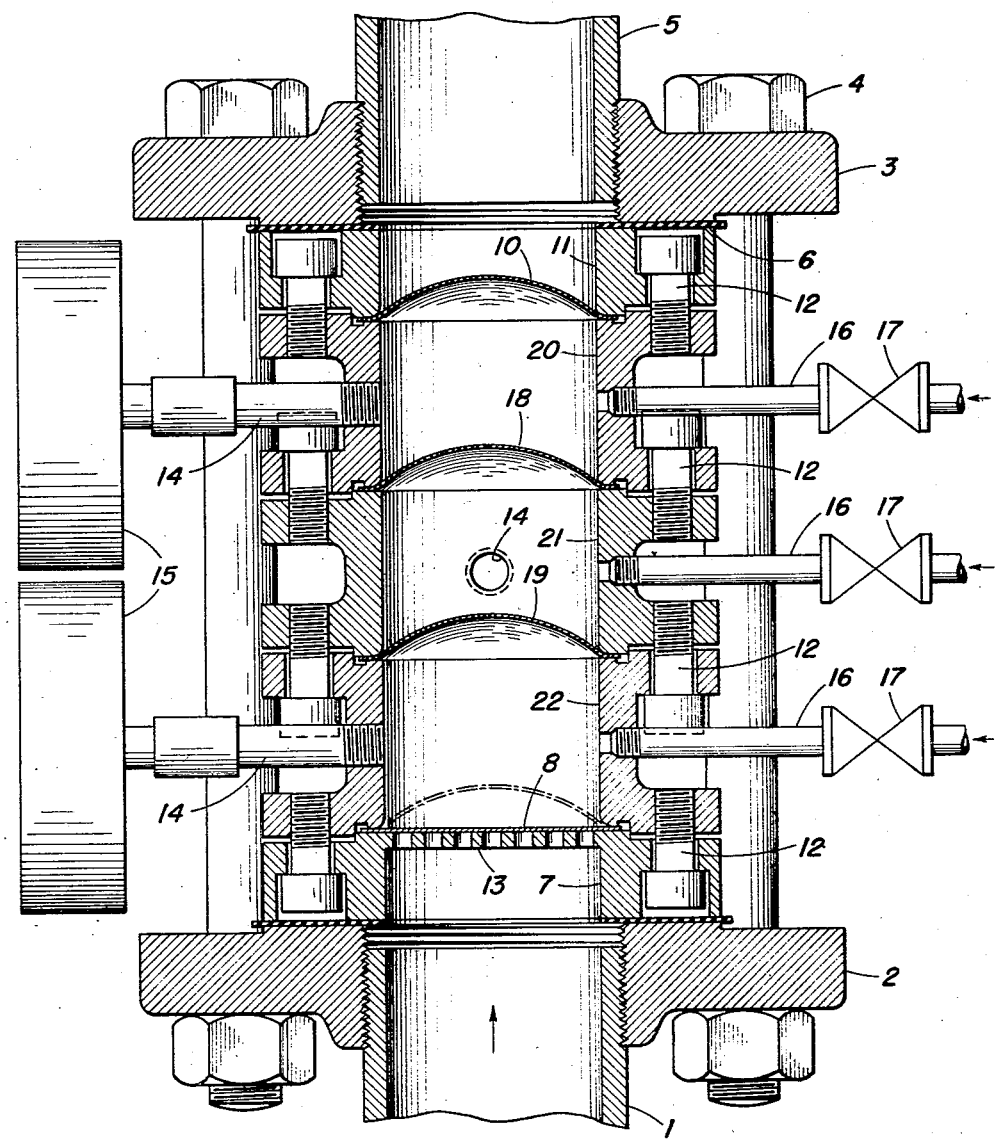
Fig. 3 shows a sectional elevation view of a device having four such diaphragms.

In Fig. 3 a modification of the embodiment of Figs. 1 and 2 is shown in which there is added between the atmosphere side diaphragm 10 and the innermost diaphragm 8 two intermediate diaphragms, 18 and 19. Each of the interdiaphragm spaces is connected through a passageway 16 to a pressure regulator 17, and similarly through a passageway 14 to a gage 15. The central clamping flange of the other embodiment is replaced by three similar clamping flanges each holding diaphragms in place. In the operation of this embodiment, an even closer approach of the POP to the rated venting pressure is possible than was true in the embodiment of Figs. 1 and 2. If the predetermined relief pressure is again 100 p. s. i., a 100 p. s. i. rated diaphragm 10, a 50 p. s. i. rated diaphragm 18, a 25 p. s. i. rated diaphragm 19, and a 12.5 p. s. i. rated diaphragm 8 are used. The space between diaphragms 10 and 18 is charged with 50 p. s. i. pressure, the space between diaphragms 18 and 19 with 75 p. s. i., and the space between diaphragms 19 and 8 with 87.5 p. s. i. Diaphragm 10, rated at 100 p. s. i. is under a pressure of 50 p. s. i. Diaphragm 18, rated at 50 p. s. i. is under a net pressure of 25 p. s. i. composed of 75 p. s. i. from the equipment side less a back pressure of 50 p. s. i. Diaphragm 19 is similarly under a net pressure of 12.5 p. s. i., composed 87.5 p. s. i. outward and 75 p. s. i. back pressure. Diaphragm 8 is protected as before against the back pressure by the vacuum guard 13. The POP is 93.75 p. s. i., since at that pressure diaphragm 8 will be subjected to a net pressure outward of 6.25 p. s. i., composed of 93.75 p. s. i. outward and 87.5 p. s. i. back pressure. Each of the diaphragms 10, 18, 19 and 8 is thus under a load of half its rated venting pressure and has therefore an indefinite life expectancy. The net result is that the pressure equipment is being safely used at a POP of 93% of the predetermined safe limit, instead of the former 50%. This multiplicity of diaphragms also has the advantage that each diaphragm in turn is held under more constant pressure and is therefore even less subject to fatigue. The diaphragms therefore have an indefinite life, unless rupture due to excess vessel pressure occurs.

Figure 4:
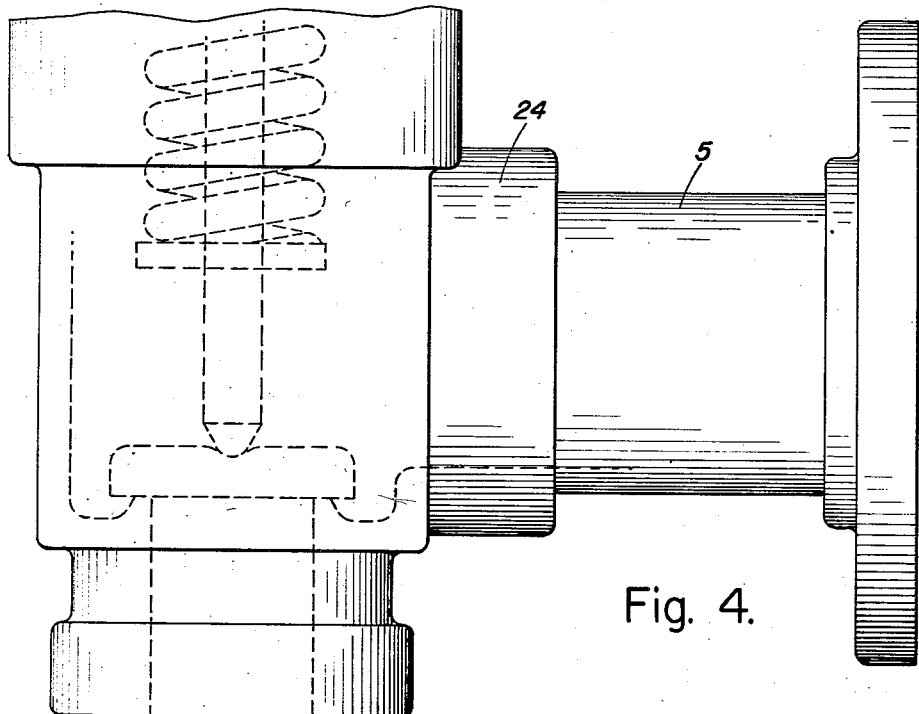
Fig. 4 shows a partial sectional elevation of a safety device in which the closure furthest from the pressure system is a calibrated safety valve.
Figure 5:
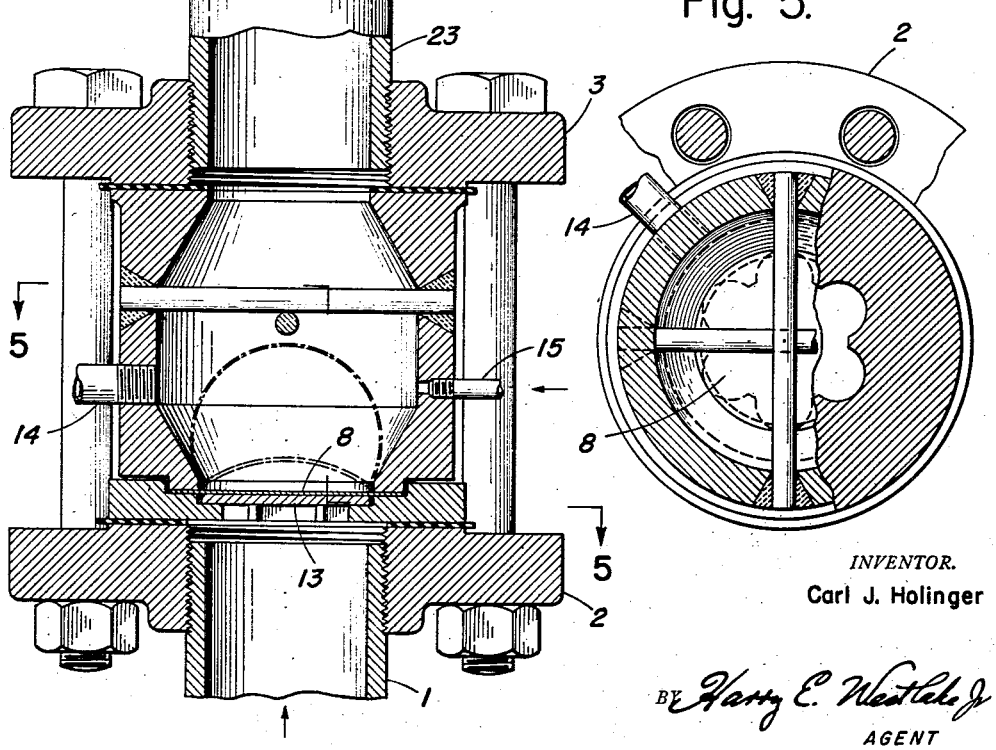
Fig. 5 shows a horizontal sectional of the device of Fig. 4 along the line 5—5, showing the section around the diaphragm.

In Figs. 4 and 5 there is shown a different embodiment in which diaphragm 10 is replaced by a calibrated and adjustable safety valve 24 which in turn is connected to the exhaust pipe 5. The safety valve 24 is fastened by the nipple 23 into the top flange 3. This embodiment of my invention is designed to provide a use of a safety valve with POP closer to the release pressure of the valve than is normally possible, in the same way that previously described embodiments permitted a closer approach of the POP to the predetermined relief pressure of those safety devices. Since safety valves begin to leak before the predetermined limit, whereas a diaphragm either holds or bursts, this embodiment has all these inherent deficiencies and advantages of a safety valve compared to diaphragms. It does however demonstrate that my invention is equally usable with other types of safety closures which release at predetermined limits. The principal advantage of such an embodiment is that the use of a safety valve as the atmosphere side closure of the safety device provides a reclosure of the pressure system after the dangerous pressure has been released, and the pressure equipment can be continued in use until replacement of fractured inner closures is convenient.

Figure 6:
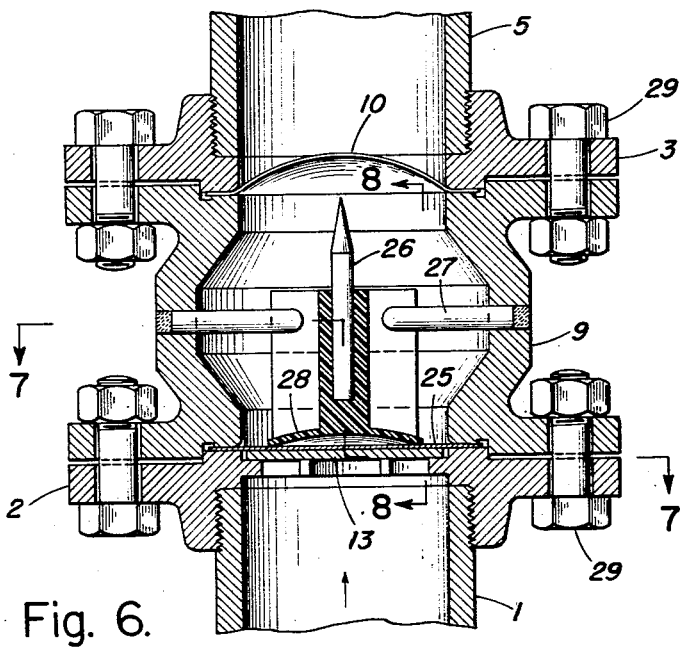
Fig. 6 shows a sectional elevation view of a device in which the outer closure is a preformed metal diaphragm of high venting pressure struction, subject to being burst by a spike actuated by an inner diaphragm of low venting pressure.
Figure 8:
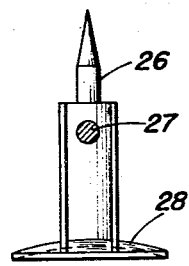
Fig. 8 shows an elevation of the spike along line 8—8.
Figure 7:
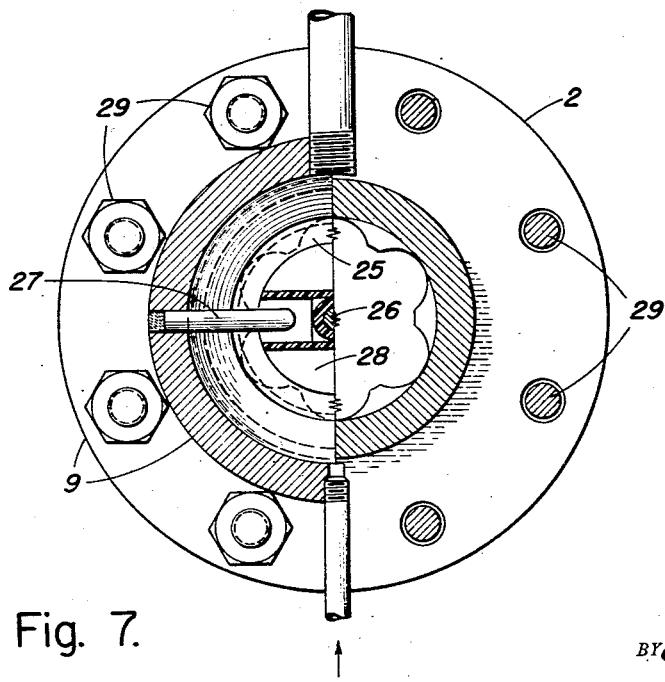
Fig. 7 shows a horizontal section of the device of Fig. 6 along the line 6—6.

In Figs. 6, 7, and 8 there is shown an embodiment in which the major differences from that of Fig. 1 are that the diaphragm 8 nearest the pressure equipment is replaced by an elastomer slack diaphragm 25 which actuates a puncture spike 26 and the diaphragm 10 nearest the atmosphere is a preformed concave-convex metal diaphragm. Studs 27 are fastened in the walls of the central clamping flange 9 projecting inwards to the gas chamber between the diaphragm. These studs can form a guide for the puncture spike but are principally intended as a stop to prevent the spike from blowing out the exhaust stack 5 in case of rupture of the diaphragms. The upper and lower main flanges 2 and 3 in this embodiment act as the upper and lower clamping flanges. They are held to the central clamping flange 9 by the small collar bolts 29. In the operation of this embodiment, the upper diaphragm 10 is, as mentioned above, a preformed metal convex-concave diaphragm having the concave side toward the pressure. This diaphragm 10 is a much stronger one than need be for the intended pressure limit of the device. The predetermined relief pressure of this safety device is fixed by a combination of the force required to puncture diaphragm 10 and the pressure in the interdiaphragm space. This combination of factors governs the response pressure limit of diaphragm 10, the response pressure of that diaphragm being that pressure at which it ruptures when punctured. When the pressure of the gas in the pressure equipment exceeds the pressure in the chamber the lower disc 25 expands, pushing the spike 26 toward the upper diaphragm 10. By the calibration of the force required to puncture diaphragm 10 and the pressure of the fluid in the interdiaphragm space (which calibration fixes the response pressure of diaphragm 25), the pressure at which the diaphragm 10 will be punctured can be calculated in advance, thus setting the relief pressure value. This modification has the advantage that the control is independent of the individual characteristics of any diaphragm, being a function of the two variables which can be calibrated in advance. Control is therefore extremely precise in this embodiment.

Figure 9:
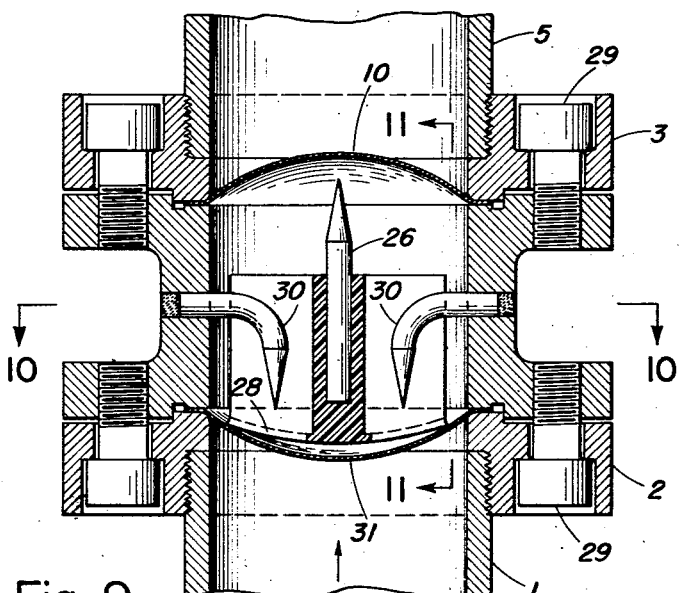
Fig. 9 shows a sectional elevation of a device constructed with two preformed concave-convex diaphragms, with a puncture spike facing each diaphragm.
Figure 11:
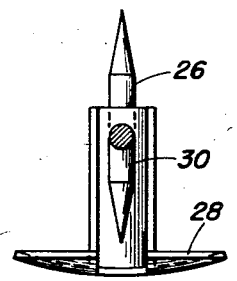
Fig. 11 shows an elevation of the puncture spike in the interior of the device of Fig. 9, along the line 11—11.
Figure 10:
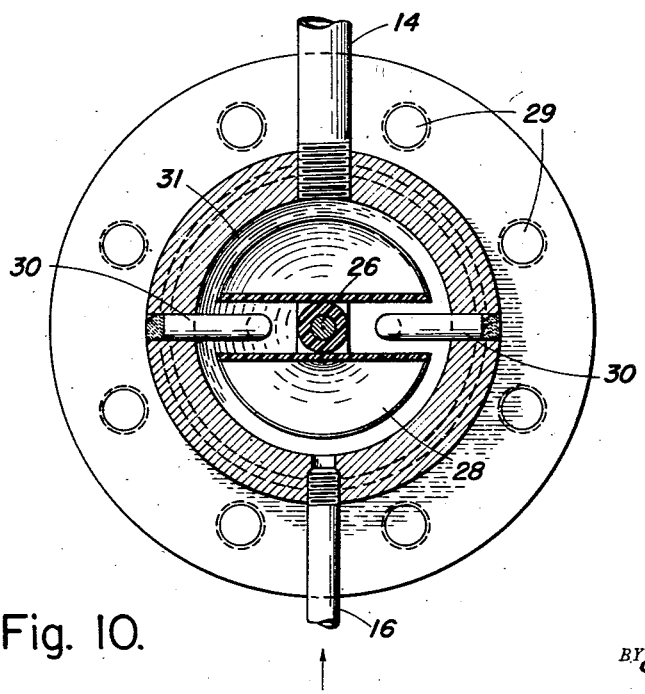
Fig. 10 shows a horizontal section of the safety device of Fig. 9 along the line 10—10.

In Figs. 9, 10 and 11 is shown a different embodiment, also using a puncture spike. The studs are bent downward and end in puncture spikes 30. The inner diaphragm 31 is also a concave-convex preformed metal diaphragm, as is the atmosphere side diaphragm 10. This embodiment takes advantage of a peculiarity of preformed metal diaphragms of this concave-convex shape. The concave side is usually presented to the high pressure and these diaphragms will burst at a reasonably predistable pressure exerted from this side. It has been known, as mentioned above, that these diaphragms would invert their shape suddenly when pressure was applied from the convex side. This inversion occurs at a pressure predictable within reasonable limits which depends on the bursting limit of the diaphragm in the normal direction. Thus a diaphragm rated at 200 p. s. i. in the normal direction has been found to invert predictably at about 24 p. s. i. from the convex side. In this embodiment use is made of the predictability of inversion by using strong diaphragms which permit a very close approach of the POP to the burst limit. This is done in the following manner. Diaphragms 10 and 31 are both rated at 200 p. s. i. in the normal direction (pressure from the concave side). It is desired to have a 100 p. s. i. predetermined relief pressure on the equipment, which is to be used at pressures closely appoaching this limit. The preformed diaphragms are installed with the puncture spike 26 of such length that inversion of the curve of diaphragm 31 will push the spike through diaphragm 10. The interdiaphragm space is loaded with a fluid (preferably a gas such as compressed air, nitrogen, etc.) under a pressure of 76 p. s. i. This pressure, being less than half the rated pressure of either diaphragm will cause no fatigue and both will have indefinite life. There is, furthermore, no need of a vacuum guard, since the diaphragm 31 is sufficiently strong to withstand the 76 p. s. i. interdiaphragm space pressure plus the 15 p. s. i. negative pressure of a perfect vacuum if that should be applied. As pressure builds up in the pressure equipment, diaphragm 31 is under positive pressure from the concave side until a pressure of 76 p. s. i. is reached. Beyond this point a positive pressure is being exerted from the convex side. The net pressure from the convex side which will produce reversal is about 24 p. s. i. This will be exerted when the pressure equipment reaches 100 p. s. i. (76 p. s. i. interdiaphragm pressure plus 24 p. s. i. inversion pressure). Reversal of the shape of diaphragm 31 occurs sharply at this pressure. This reversal is the response pressure of this diaphragm. The reversal pushes the spike 26 through diaphragm 10. The pressure at which this puncturing takes place is the response pressure of the closure 10 and is a function of the construction of the device. At the same time the inverted spikes 30 puncture diaphragm 31 as it inverts. The pressure in the equipment is then released through the burst diaphragms. The necessity for the downward pointed spikes 30 is due to the fact that the inversion of diaphragm 31 does not mean that it will necessarily break. Inversion weakens a diaphragm but it will very often survive one or more inversions without breaking. The spike 30 insures that the diaphragm 31 will break on the first inversion.

The POP can approach the predetermined relief pressure in this embodiment as closely as the reliability of the inversion pressure of the diaphragm is known. In the above example, it is estimated that the safe POP would be about 94 p. s. i. In this embodiment there is thus achieved an approach of the POP to the predetermined relief pressure, using only two diaphragms, as good as that achieved with four diaphragms in the embodiment of Fig. 3. This is due to the fact that it permits the use of a relatively low net positive pressure, with respect to the venting pressure, on the diaphragm closest to the pressure equipment, to initiate the bursting when the predetermined relief pressure is reached in the equipment.

Figure 12:
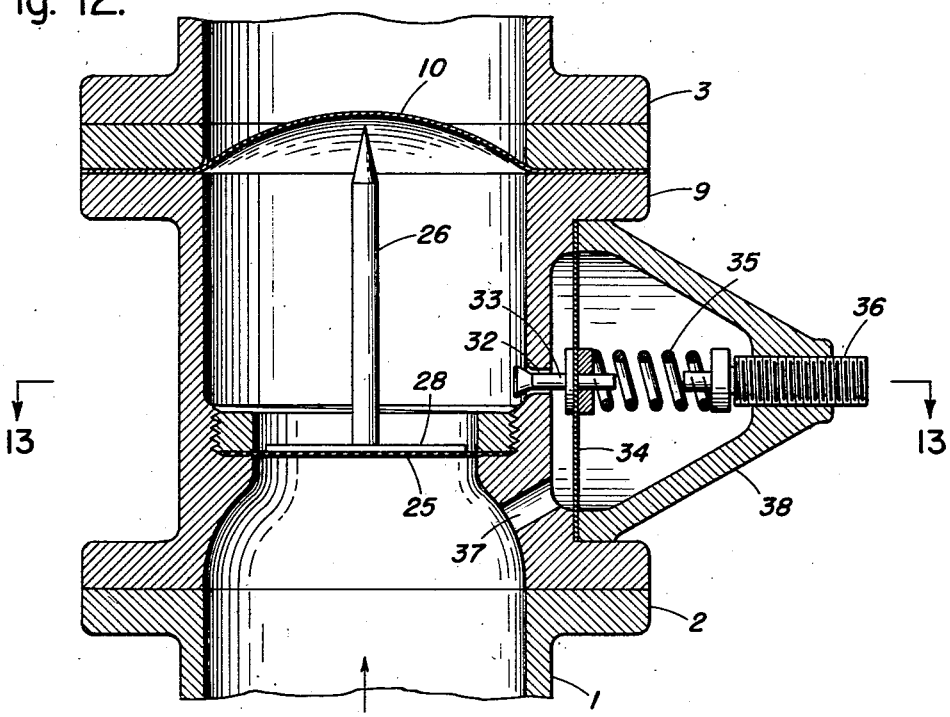
Fig. 12 shows a sectional elevation of an automatic mechanism for adjusting pressure between the pressure system and the interdiaphragm space up to a predetermined limit controlled by an adjustable screw, as installed on the safety device of Fig. 6.
Figure 13:
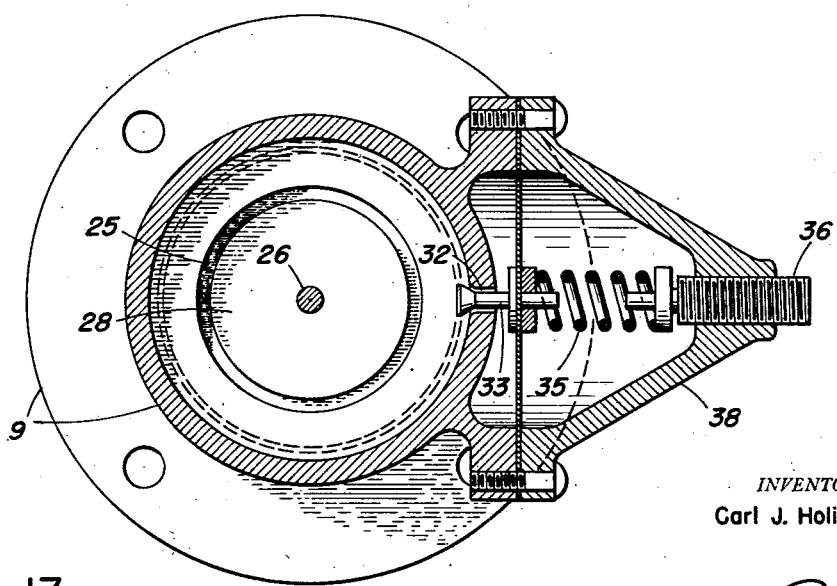
Fig. 13 is a horizontal section of the device of Fig. 12 along the line 13—13.

In Figs. 12 and 13 there is shown a device which may be applied to any of the other embodiments which have been shown. It is, however, shown in these figures as applied to the embodiment described in Figs. 6, 7, and 8. The pressure regulator 17 and its connecting passageway 16 are replaced by a vent in the interdiaphragm base 32 through which protrudes, into the interdiaphram space a valve 33. The valve 33 is attached to a diaphragm 34, which is in turn pressed by a spring 35. The compression of this spring 35 is controlled by an adjusting screw 36. The space between the diaphragm and the outer wall of the central cylinder 9 is also connected to the pressure equipment through a passageway 37. The diaphragm is held in place by a frame 38 which also holds the adjusting screw 36. In the operation of this embodiment a pressure within the pressure system less than that required to overcome spring 35 on the area of diaphragm 34 opens valve 33. This permits passage of gas under pressure through the passageway 37 and the corresponding valve seat 32, into the interdiaphragm space. When the pressure within the pressure system then increases, the diaphragm 34 is pushed in such a way as to close the valve 33. The point at which this closure will be complete can be regulated by the setting of the adjustable screw 36, changing the compression on the spring 35. When the valve 33 is closed, a further build-up of pressure in the pressure equipment causes the diaphragm 28 to expand upward and puncture the upper diaphragm 10, by means of the puncture spike 26. This self-regulating system can similarly be placed on any of the other embodiments described in the other figures, in place of the gas regulators. This modification has the advantage of eliminating the need for an outside source of fluid pressure in the interdiaphragm space. It may not, however, be used if there is danger of sublimed material plugging the passageways 32 and 37 or of corrosive gases in the pressure equipment weakening any part of the safety device.

The fluid used to keep a pressure in the interdiaphragm space in my invention is not critical. Preferably it is a gas, and preferably this gas is compressed air. However, nitrogen, carbon dioxide and similar gases can serve as suitable fluids. Liquids such as silicones, high boiling hydrocarbons, chlorinated hydrocarbons and other inert materials can also be used in some embodiments.

In the general overall consideration of this invention, the pressure in the pressure chambers between the closures must be related to the response pressure of the closures forming those chambers in such a way that the entire device vents when the predetermined relief pressure is reached. Auxiliary requirements are that no chamber pressure may be greater than two-thirds of the venting pressure of the closure to the atmosphere side of said chamber, and that the sum of each chamber pressure and the response pressure of the closure to the pressure equipment side of said chamber be no greater than the predetermined relief pressure and in at least one case equal to it. The reasons for these restrictions can be illustrated by the following discussion with reference to the simplest embodiment, that of Fig. 1.

In the previous discussion of the operation of this embodiment, it was shown that to have a 100 p. s. i. predetermined relief pressure for the device, the closure 10 could be a 100 p. s. i. rated diaphragm, the inner closure 8 could be a 50 p. s. i. rated diaphragm and the pressure chamber between the closures could be charged with a fluid under 50 p. s. i. pressure. The equipment could then be run under 75 p. s. i. POP without straining either closure above 50% of its rating. If, however, the fluid pressure in the inter-closure chamber is now allowed to rise to 75 p. s. i., the safety device will no longer release at 100 p. s. i., as desired. Until a pressure of 75 p. s. i. develops in the equipment, closure 8 is not under an outwardly directed pressure. As the equipment pressure builds up, the closure 8 will not burst until a net pressure of 50 p. s. i. is exerted outward, which means 50 p. s. i. plus the 75 p. s. i. back pressure or 125 p. s. i. However, under this condition, closure 10 is under considerable strain and will have greatly reduced life.

If, on the other hand, a pressure of only 30 p. s. i. is put in the inter-closure chamber, the inner closure 8 will burst at an equipment pressure of 80 p. s. i. The closure 10 will not burst immediately at 80 p. s. i. but it will have a short life at that pressure due to strain. Such an arrangement is, in effect, hardly better than running the equipment with a single closure rated at 100 p. s. i. (POP 50 p. s. i.) because the 30 p. s. i. fluid pressure plus the 25 p. s. i. POP of diaphragm 8 adds up to only 55 p. s. i. POP.

A device of a lower POP can be made to operate at the same relief pressure with two closures 8 and 10 of 67 p. s. i. response pressure. The pressure in the chamber of this device would be 33 p. s. i. which is one-half the response pressure of closure 10 so that closure 10 will have a long life. This device, with the response pressure (67 p. s. i.) of closure 8 will give a relief pressure of 100 p. s. i. However, the POP is only 66 p. s. i. consisting of the 33 p. s. i. fluid pressure plus one-half (33 p. s. i.) of the response pressure of the closure 8.

If a higher response pressure closure is closer to the equipment than a lower response one, the pair can similarly be made to give a POP greater than that of a single diaphragm, but the highest POP is attained in the assembly when the closure response pressure decreases from the vent side of the assembly to the system side, and when the fluid pressure in the chambers (when there is more than one chamber) increases in the same direction.

The principal advantage of my invention, as has been described above in detail in connection with the figures, is to extend the permissible operating pressure, or POP, of pressure equipment almost to the maximum permissible pressure, at the same time that the reliability of that predetermined relief pressure is maintained or even increased. This permits the use of safety devices having lower limits than those usual for a given operating pressure. Consequently, the pressure system need be constructed only for a small excess of pressure over that at which it is contemplated it will be used, an important advantage since the construction of pressure equipment is very expensive. Any reduction in needed strength represents a marked savings in equipment cost.

It is a further advantage of my invention that there is no adverse effect on the safety device from evacuation of the pressure equipment since provision is made, by vacuum guards or by the construction of the diaphragm closest to the equipment to protect the safety device against weakening distortion under such strain.

It is a further advantage of my invention that the dangers of diaphragm fatigue are substantially eliminated. The constant flexing of a diaphragm over large pressure changes causes deformation and strain, after repeated use, which causes the venting pressure to change from that originally calibrated and to become much lower. The operation of the pressure equipment then becomes less certain since the safety device will relieve the pressure at an unknown but much lower pressure.

It is also an advantage of my invention that the ordinary safety diaphragms available in industry are directly usable in the safety device of my invention, obviating a need for the construction of special diaphragms.

I claim:

1. A safety device for pressure equipment which comprises a tubular passageway between the said pressure equipment and the atmosphere, said passageway being blocked by a plurality of closures forming chambers within said pasageway, means for establishing positive fluid pressure within the said chambers, said chamber pressures being such that the sum of the pressure in any chamber and the response pressure of the closure on the pressure equipment side of said chamber is no greater than the predetermined relief pressure of the said safety device and in at least the chamber nearest the said pressure equipment is equal to said relief pressure, each said chamber pressure being such that the net pressure towards the atmosphere on the closure bounding said chamber on the atmosphere side is no greater than two-thirds the response pressure of said closure, and the permissible operating pressure of said pressure equipment is more than two-thirds the said predetermined relief pressure of the said safety device.

2. The safety device of claim 1 in which the closure on the atmosphere side is a preformed metal diaphragm of concave-convex shape, having the concave side toward the pressure equipment.

3. The safety device of claim 1 in which the said passageway is blocked by at least three closures, the closure nearest the pressure equipment being preformed metal diaphragm of concave-convex shape having the concave side towards the pressure chambers of the said device and the convex side towards the said pressure equipment, and means for causing the puncture of said closure when in the inverted position are positioned in the chamber immediately to the atmosphere side of said closure.

4. The safety device of claim 1 in which the closure nearest the said pressure equipment has positioned on the pressure equipment side of said closure an unfastened metal disk and means for support of said disk against motion in the direction of the pressure equipment.

5. The safety device of claim 1 in which each said chamber pressure is no more than one-half the response pressure of the atmosphere side bounding closure of said chamber.

6. The safety device of claim 5 in which the said passageway is blocked by only two closures.

7. The safety device of claim 5 in which the closure nearest the atmosphere is a safety valve adjusted to open at the predetermined relief pressure limit and to close when said limit is no longer exceeded.

8. The safety device of claim 5 in which the fluid pressure in the said chambers is maintained through communication passageways around each closure on the pressure equipment side of each said chamber, pressure actuated adjustable means for closing said communications passageways at predetermined limits, each said limit for each chamber differing from the predetermined relief pressure of said safety device by no more than the response pressure of each said closure on the pressure equipment side of the said chamber.

9. The safety device of claim 1 in which the said passageway is blocked by only two closures.

10. The safety device of claim 9 in which the closure on the atmosphere side is a preformed metal diaphragm of concave-convex shape, having the concave side toward the pressure equipment.

11. The safety device of claim 10 in which the closure on the pressure equipment side is a flexible diaphragm having a puncture means positioned such that at the response pressure of the said flexible diaphragm the said puncture means is moved sufficiently to rupture the said atmosphere side diaphragm.

12. The safety device of claim 11 in which the said flexible diaphragm is a preformed metal diaphragm of concave-convex shape having the concave side towards the said pressure chamber and the convex side toward the said pressure equipment, said puncture means being moved by the inversion of the shape of said flexible diaphragm, and means for puncturing said flexible diaphragm when in the inverted position are positioned in said chamber.

References Cited in the file of this patent
UNITED STATES PATENTS

| | | |
|---|---|---|
| 1,549,665 | Hill et al. | Aug. 11, 1925 |
| 2,123,662 | Raymond | July 12, 1938 |
| 2,387,353 | Raymond | Oct. 23, 1945 |
| 2,505,456 | Beecher | Apr. 25, 1950 |
| 2,526,795 | Andrews | Oct. 24, 1950 |
| 2,571,961 | Smith | Oct. 16, 1951 |